(12) United States Patent
Baca et al.

(10) Patent No.: US 11,403,777 B2
(45) Date of Patent: Aug. 2, 2022

(54) COMPUTER VISION ASSISTED ITEM SEARCH

(71) Applicant: Intel Corporation, Santa Clara, CA (US)

(72) Inventors: Jim S Baca, Corrales, NM (US); David Stanasolovich, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/853,018

(22) Filed: Apr. 20, 2020

(65) Prior Publication Data

US 2021/0074013 A1 Mar. 11, 2021

Related U.S. Application Data

(63) Continuation of application No. 15/948,663, filed on Apr. 9, 2018, now abandoned, which is a continuation
(Continued)

(51) Int. Cl.
*G06K 9/00* (2022.01)
*G06T 7/60* (2017.01)
(Continued)

(52) U.S. Cl.
CPC ............. *G06T 7/60* (2013.01); *G06K 9/6267* (2013.01); *G06T 7/40* (2013.01); *G06T 7/50* (2017.01);
(Continued)

(58) Field of Classification Search
CPC ........... H04N 21/4788; H04N 21/4821; H04N 21/23; H04N 21/23418; H04N 21/235;
(Continued)

(56) References Cited

U.S. PATENT DOCUMENTS 5,944,839 A * 8/1999 Isenberg ............. G06F 11/2257
714/26
9,489,401 B1 * 11/2016 Garcia ................ G06F 16/5846
(Continued)

FOREIGN PATENT DOCUMENTS

JP 2010262425 11/2010
KR 1020070028862 3/2007
(Continued)

OTHER PUBLICATIONS

"International Application Serial No. PCT US2016 061828, International Search Report dated Feb. 20, 2017", 3 pgs.
(Continued)

*Primary Examiner* — Shervin K Nakhjavan
(74) *Attorney, Agent, or Firm* — Hanley, Flight & Zimmerman, LLC

(57) ABSTRACT

System and techniques for computer vision assisted item search are described herein. A composite image, including visual data and depth data, may be obtained. The composite image may be filtered to isolate a clothing article represented in the composite image. A classifier may be applied to the depth data to produce a set of clothing attributes for the clothing article. The clothing attributes may then be provided to a remote device.

36 Claims, 4 Drawing Sheets

Related U.S. Application Data of application No. 14/970,023, filed on Dec. 15, 2015, now Pat. No. 9,940,728.

(51) Int. Cl.
*G06T 7/40* (2017.01)
*G06K 9/62* (2022.01)
*G06V 40/10* (2022.01)
*G06T 7/50* (2017.01)

(52) U.S. Cl.
CPC .... *G06V 40/10* (2022.01); *G06T 2207/10024* (2013.01); *G06T 2207/10028* (2013.01); *G06T 2207/20024* (2013.01); *G06T 2207/20221* (2013.01)

(58) Field of Classification Search
CPC ........... H04N 21/258; H04N 21/25866; H04N 21/278; H04N 21/4126; H04N 21/4227; H04N 21/4334; H04N 21/4344; H04N 21/4394; H04N 21/44008; H04N 21/47214; H04N 21/478; H04N 21/4884; H04N 21/632; H04N 21/6334; H04N 21/6543; H04N 21/812; H04N 21/8133; H04N 21/4147; H04N 21/43635; H04N 21/43637; H04N 21/4402; H04N 21/84; H04N 21/8547; H04N 21/252; H04N 21/26291; H04N 21/4221; H04N 21/4312; H04N 21/462; H04N 21/4668; H04N 21/4756; H04N 21/482; H04N 21/4826; H04N 7/183; G06T 17/20; G06T 2210/16; G06T 13/40; G06T 15/205; G06T 17/10; G06T 19/006; G06T 2207/10024; G06T 11/206; G06T 11/60; G06T 15/04; G06T 1/00; G06T 2200/24; G06T 2207/10028; G06T 2207/10032; G06T 2207/20084; G06T 2207/30124; G06T 2207/30196; G06T 2210/41; G06T 2210/56; G06T 7/00; G06T 7/0002; G06T 7/0051; G06T 7/0081; G06T 7/11; G06T 7/13; G06T 7/194; G06T 7/33; G06T 7/42; G06T 7/45; G06T 7/50; G06T 7/90; G06T 7/97; G06K 9/00671; G06K 9/00711; G06K 9/4671; G06K 9/66; G06K 17/0022; G06K 2009/00738; G06K 2009/4666; G06K 2209/01; G06K 7/10386; G06K 9/00281; G06K 9/00308; G06K 9/00362; G06K 9/00624; G06K 9/00718; G06K 9/00744; G06K 9/00791; G06K 9/3258; G06K 9/4642; G06K 9/4647; G06K 9/4652; G06K 9/52; G06K 9/6201; G06K 9/6211; G06K 9/6215; G06K 9/6217; G06K 9/6218; G06K 9/6227; G06K 9/6262; G06K 9/6263; G06K 9/6267

See application file for complete search history.

(56) References Cited

U.S. PATENT DOCUMENTS

| | | | |
|---|---|---|---|
| 9,940,728 B2 | 4/2018 | Baca et al. | |
| 10,083,521 B1* | 9/2018 | Dhua | G06Q 30/0603 |
| 2009/0029679 A1* | 1/2009 | Hu | H04M 3/436 |
| | | | 455/412.1 |
| 2009/0164397 A1* | 6/2009 | Kwok | G06N 3/004 |
| | | | 706/21 |
| 2013/0044944 A1 | 2/2013 | Wang et al. | |
| 2014/0035913 A1* | 2/2014 | Higgins | G06Q 30/00 |
| | | | 345/420 |
| 2014/0176565 A1* | 6/2014 | Adeyoola | G06F 16/5854 |
| | | | 345/473 |
| 2015/0017958 A1* | 1/2015 | Kang | G06F 21/6263 |
| | | | 455/414.2 |
| 2015/0036883 A1* | 2/2015 | Deri | G06K 9/00369 |
| | | | 382/103 |
| 2015/0206292 A1* | 7/2015 | Masuko | G06T 19/006 |
| | | | 705/27.2 |
| 2015/0248583 A1* | 9/2015 | Sugita | G06Q 30/0643 |
| | | | 348/77 |
| 2015/0379005 A1* | 12/2015 | Dorner | G06F 16/58 |
| 2016/0042443 A1* | 2/2016 | Osada | G06T 11/60 |
| | | | 705/27.2 |
| 2016/0240002 A1* | 8/2016 | Ogata | G06T 7/90 |
| 2016/0292779 A1* | 10/2016 | Rose | G06Q 30/0643 |
| 2017/0046769 A1* | 2/2017 | Jackson | G06Q 30/0631 |
| 2017/0147945 A1* | 5/2017 | Henderson | G06Q 10/067 |
| 2017/0169580 A1 | 6/2017 | Baca et al. | |
| 2018/0330516 A1 | 11/2018 | Baca et al. | |

FOREIGN PATENT DOCUMENTS

| | | |
|---|---|---|
| KR | 1020100071822 | 6/2010 |
| KR | 1020140130767 | 11/2014 |
| WO | 2017105707 | 6/2017 |

OTHER PUBLICATIONS

"International Application Serial No. PCT US2016 061828, Written Opinion dated Feb. 20, 2017", 7 pgs.
"U.S. Appl. No. 14/970,023, Non Final Office Action dated Jun. 15, 2017", 18 pgs.
"U.S. Appl. No. 14/970,023, Response filed Sep. 15, 2017 to Non Final Office Action dated Jun. 15, 2017", 10 pgs.
"U.S. Appl. No. 14/970,023, Notice of Allowance dated Dec. 4, 2017", 11 pgs.
"International Application Serial No. PCT US2016 061828, International Preliminary Report on Patentability dated Jun. 28, 2018", 9 pgs.
"U.S. Appl. No. 15/948,663, Non Final Office Action dated Oct. 18, 2019", 19 pgs.

* cited by examiner

COMPUTER VISION ASSISTED ITEM SEARCH

PRIORITY APPLICATION

This application is a continuation of U.S. application Ser. No. 15/948,663, filed Apr. 9, 2018, which is a continuation of U.S. application Ser. No. 14/970,023, filed Dec. 15, 2015, now issued as U.S. Pat. No. 9,940,728, all of which are incorporated herein by reference in their entirety.

TECHNICAL FIELD

Embodiments described herein generally relate to computer vision and more specifically to computer vision assisted item search.

BACKGROUND

Cameras generally capture light from a scene to produce an image of the scene. Some cameras can also capture depth or disparity information. These multi-mode cameras are becoming more ubiquitous in the environment, from mobile phones, to gaming systems, etc. Generally, the image data is provided separately from the depth data to consuming applications (e.g., devices, software, etc.).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
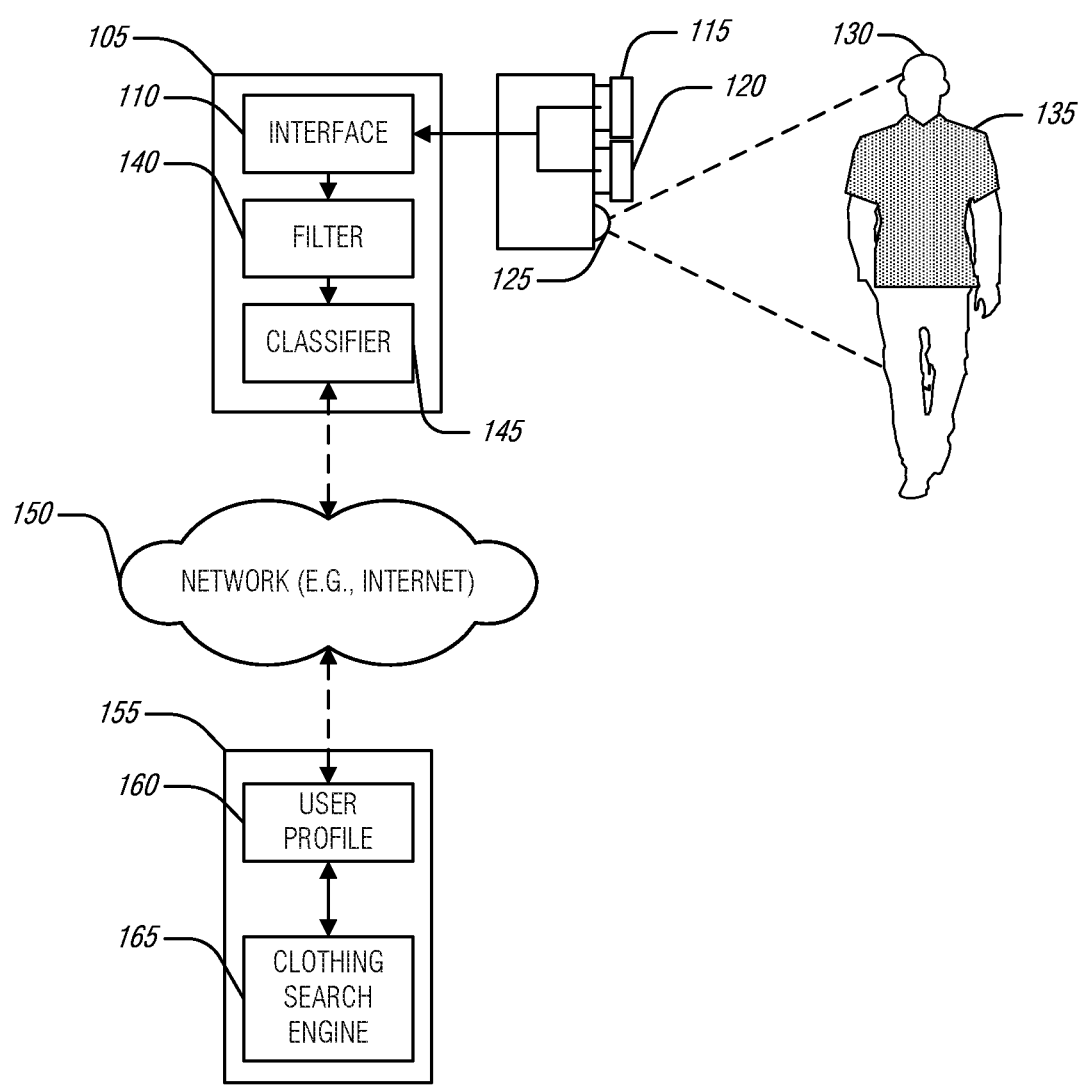
FIG. 1 is a block diagram of an example of an environment including a system for computer vision assisted item search, according to an embodiment.

While devices exist to capture both two dimensional (e.g., visual) images and three dimensional (e.g., depth) images, use of these data streams is generally relegated to specific applications, such as gesture recognition or modeling. Combining visual and depth data to provide additional context to observed objects may yield a richer user experience in a number of area. One such area includes items that are sized and styled for people, such as clothing, bicycles, etc. In this area, non-invasive sensors (e.g., a camera and depth sensor) may capture not only the style (e.g., pattern) of a clothing article, but also use depth data to establish its shape and size. This sensor data may be combined with a user profile to establish actual clothing articles to acquire for the user via a search powered by the captured visual and depth data. Thus, for example, a user who prefers wearing a jacket that is discontinued may be relieved of the burden of searching through innumerable jackets to find a replacement that will fit her.

Described herein is a method and system to automatically use both visual data and embedded depth data to establish contextual information about what people are wearing or using in a picture or video (e.g., media). This contextual information may, in an example, be used by retailers to provide targeted sales and deliveries to specific individuals present in the media.

Examples of depth-enabled contextual information include textures, shapes, and sizes. This information may be combined with visual-based contextual information, such as colors, material patterns, styles of clothing articles, linked outfits, recreational items (bikes, running shoes, balls, etc.), other individuals in the picture, locations present in the picture, etc., to identify similar items that conform to the fit and style of the subject person.

The contextual information may be created in whole or part in a local device of the user (e.g., mobile phone, tablet, etc.) or a network service (e.g., cloud service). In an example, the creation and maintenance of a user profile or the presentation of search results based on the contextual information or the profile, or the delivery of clothing articles to the user will include a user interface to enable the user to control how and where these processes will interact with the user (e.g., opt-in, opt-out, etc.). A user's identity may be determined via a number different mechanisms. For example, the device from which the media was transferred (e.g., uploaded) may be registered with the service and provide identification for the user. In an example, facial recognition or similar techniques may be used to identify the user. In an example, the location that the media was captured may accompany or be embedded in the media and provide identification (e.g., the location may be an apartment of the user). These identification techniques may be combined in any number of ways—such as, in a business with three employees, one of which is male; the location and a visual processing technique identifying the user as male may be combined to identify the male employee.

As noted above, a user profile may be maintained of the user. The depth and visual contextual information extracted from the media and may be input into an analysis engine to identify patterns and preferences for the user. The analysis engine may check for other media (e.g., in the cloud) of the user. Patterns and preferences of the user may be compiled from found media may be used to update the user's profile. As multiple pictures (by potentially different sources) containing the same individual are used, the accuracy and richness of the patterns and preferences are increased.

A search engine may user the user's profile data, including the integrated depth and visual data, to identify other clothing articles. In an example, the results of the search may be used to communicate the existence of these items to the user. In an example, the search may include related items that are different. For example, analytics applied to the user profile may be used to interpolate possible new clothing preferences (e.g., styles) based on, for example, new trends in fashion, sports, etc. In an example, the communication may include an opportunity for the user to acquire the item. In an example, the communication may include delivery of the item to the user in accordance with the user profile.

FIG. 1 is a block diagram of an example of an environment including a system for computer vision assisted item search, according to an embodiment. The system 100 may include a local device 105. The local device 105 may include, or be communicatively coupled to, a detector 115 (e.g., a camera, or other mechanism to acquire visual data (measuring luminance of reflected light) in a scene) and a depth sensor 120. As used herein, visual data, alone, is a luminance-based representation of the scene that may also include wavelength (e.g., color) information.

The depth sensor 120 is arranged to sample reflected energy from the environment. The sampling may be contemporaneous (e.g., as close to the same time as possible) with the light sample of the detector 115. The depth sensor 120 is arranged to use the sampled reflected energy to create depth data of the scene. As used herein, pixels, or their equivalent, in the depth data represent distance from the depth sensor 120 and an element in the scene, as opposed to luminance as in an image. In an example, the depth data pixels may be called voxels as they represent a point in three-dimensional space.

The depth sensor 120 may make use of, or include, an emitter 125 to introduce a known energy (e.g., pattern, tone, timing, etc.) into the scene, which is reflected from elements of the scene, and used by the depth sensor 120 to established distances between the elements and the depth sensor 120. In an example, the emitter 125 emits sound. The reflected energy of the sound interacting with scene elements and known timing of the sound bursts of the emitter 125 are used by the depth sensor 120 to establish distances to the elements of the scene.

In an example, the emitter 125 emits light energy into the scene. In an example, the light is patterned. For example, the pattern may include a number of short lines at various angles to each other, where the line lengths and angles are known. If the pattern interacts with a close element of the scene, the dispersive nature of the emitter 125 is not exaggerated and the line will appear closer to its length when emitted. However, when reflecting off of a distance element (e.g., a back wall), the same line will be observed by the depth sensor 120 as much longer. A variety of patterns may be used and processed by the depth sensor 120 to established the depth information. In an example, time of flight may be used by the depth sensor 120 to establish distances using a light-based emitter 125.

The local device 105 may include an interface 110. The interface 110 is arranged to interact with the detector 115 and the depth sensor 120 to obtain both image and depth data, for example, as a composite image. The interface 110 may buffer the data, or it may coordinate the activities of the detector 115 and the depth sensor 120. The interface 110 may be implemented as a chipset, a driver, or a combination of both.

The local device 105 may include a filter 140. The filter 140 is arranged to isolate a clothing article represented in the composite image. Such isolation may be called segmentation. A variety of computer vision techniques may be used by the filter, including application of Gabor filters, noise boundary mechanisms, edge detection, neural network classification, etc. In an example, the filter may be located in the remote device 155. In an example, the functionality of the filter may be split between the local device 105 and the remote device 155.

In an example, the filter 140 may perform an initial classification on the isolated clothing article to, for example, determine a type for the clothing article. Example types may include, pants, underwear, shirt, shoes, jacket, dress, shorts, headwear, bag, wallet, watch, necklace, eye glasses, scarf, etc. This initial classification may be referred to as a rough classification. The rough classification result may be included to the composite image, for example, as metadata, or passed along with the composite image to the classifier 145 with the isolated clothing article portion of the composite image (e.g., the pixels and voxels of the visual and depth data that represent the clothing article in the composite image).

The local device 105 may include a classifier 145. The classifier 145 is arranged to accept the depth data and produce a set of clothing attributes that correspond to the clothing article. The illustrated example clothing article is a shirt 135 worn by the user 130. The classifier 145 may be implemented with a neural network (e.g., deep Boltzmann machine or the like), a stochastic classifier, an expert system, or other classification mechanism used in semantic processing of visual data by a computer. In an example, the classifier 145 may be implemented in the remote device 155 as opposed to the local device 105. In an example, the classifier 145 may be implemented partially on the local device 105 and partially on the remote device 155.

The clothing attributes produced by classifier 145 may be called contextual information with respect to the clothing article. In an example, the clothing attributes may include one or more of a color or pattern. In an example, these attributes may be a sub-category of clothing attributes known as visual-based contextual information.

In an example, the clothing attributes may include one or more of a size, a shape, or a texture. In an example, these attributes may be a sub-category of clothing attributes known as depth-based contextual information. The depth-based contextual information may be determined solely, or in majority part, from the depth data. Size, for example, may be determined by geometrically measuring the distances between edged defined by voxels of a shirt. In an example, a two-dimensional pixel representation of the shirt edges may be scaled using the depth information to establish an absolute size. However, in an example, a classifier, such as a neural network classifier, may be trained to accept the voxels of the isolated clothing article and produce a clothing size. As used herein absolute size refers to a measurement in inches, centimeters, or the like of the article, and clothing size refers to metrics used in the garment industry, such as large, medium, small, extra-long, etc. In an example, the classifier 145 is arranged to convert an absolute size into a clothing size and provide it as one of the clothing attributes.

As noted above, clothing article texture, such as smooth, shiny, rough, fuzzy, furry, etc. may be provided by the classifier 145 as clothing attributes. In an example, where patterned light is used by the depth sensor 120, such texture may be determined by noting a diffusion of the pattern. Thus, while a close article may reflect a small bar, the diffuse edges of the bar or total luminance of the bar may conform to a known pattern of reflecting for a knit at the detected distance, as opposed to leather, which may have sharper edges or greater reflectivity at the same distance. Also, with the identification of the clothing type, such diffusion or reflectivity patterns may be used to identify likely materials. Accordingly, a suit jacket may be classified as wool more often than a shirt would. Thus, in an example, the texture may be used to provide a fabric of the clothing article as a clothing attribute.

As noted above, clothing article shape may also be provided as a clothing attribute by the classifier 145. In this example, the shape is the three dimensional shape of the clothing article, similarly to a depth sensor provided model used for three dimensional printing. The voxels used in the shape classification may also be used to select a known shape based on their relation to each other. For example, a western style vest may be distinguished from a flat bottomed vest based on voxels indicating that the vest surface extends downwards on either side of the central fastening seam (e.g., where the buttons are placed).

The local device 105 may include a transceiver. The transceiver is arranged to communicate with remote machine (e.g., remote device 155) via a network 150. The transceiver is arranged to provide the clothing attributes to the remote device 155. The transceiver may also be arranged to accept the delivery messages (e.g., described below) and provide the user response to the delivery messages for the local device 105.

The remote device 155 may accept the clothing attributes from the local device 105 (or from itself when one or more of the filter 140 or classifier 145 are located in the remote device 155) or other device providing the clothing attributes. The remote device 155 includes a user profile 160 data structure and the interfaces used to create, update, or other manipulate the user profile 160. Thus, the remote device 155 is arranged to update the user profile 160 with the clothing attributes received form the local device 105. In an example, the user profile includes a separate data structure for each clothing item identified as corresponding to the user 135 and the clothing attributes are placed in this data structure. In an example, the user profile includes a context data structure. The context data structure may include one or more fields corresponding to geographic location, landmark, event, or companion to the user 135 and a clothing article. Thus, for example, when processed by the clothing search engine 135, a dress of a particular style worn to a company Christmas event last year of a certain size, color, and material may be used as inputs to search for a new dress for the upcoming Christmas event this year.

As noted above, the remote device 155 includes a clothing search engine 165. The clothing search engine 165 is arranged to search for additional clothing items using the clothing attributes and the user profile 160. Such a search may include incorporating a user's calendar (as described above), using the clothing attributes as inputs (e.g., size 42 wool tweed sport coat as keywords), or as parameters to an artificial intelligence engine. In this manner, the system 100 may find clothing that the user 135 otherwise may not have. In an example, the search includes a restriction that the additional clothing items differ from the clothing article. Such a restriction may be implemented, for example, by negating a keyword, or other search input, derived from the clothing attributes. In an example, the restriction may be implemented by replacing a keyword with another word of the same type (e.g., replacing "red" with "blue" as a color when a clothing article's color is red). In an example, the restriction is directed to one or more of color, pattern, style, or type clothing attributes. In an example, where the additional clothing differs in type from the article of clothing, the search results may be filtered such that passing search results will combine with the clothing article to add to a class of outfits. For example, is the clothing article is a pair of slacks, the additional clothing articles are filtered to create outfits with the slacks when combined. Such a filter may be implemented as a model in which selections in part of the model are constraints on other parts of the model.

In an example, the search results of the clothing search engine 165 may be provided to a third party. In an example, the results, or a portion thereof, may be provided to the user 135, in the form of a delivery message. In an example, the delivery message includes a mechanism (e.g., application, instructions, etc.) enabling the user 135 to confirm that the clothing items of the delivery message are desired by the user 135. In an example, the search results, or a portion thereof, may be automatically delivered to the user 135, the remote device 155 initiating such a deliver (e.g., via an application programming interface (API) of a retailer) in an example.

Figure 2:
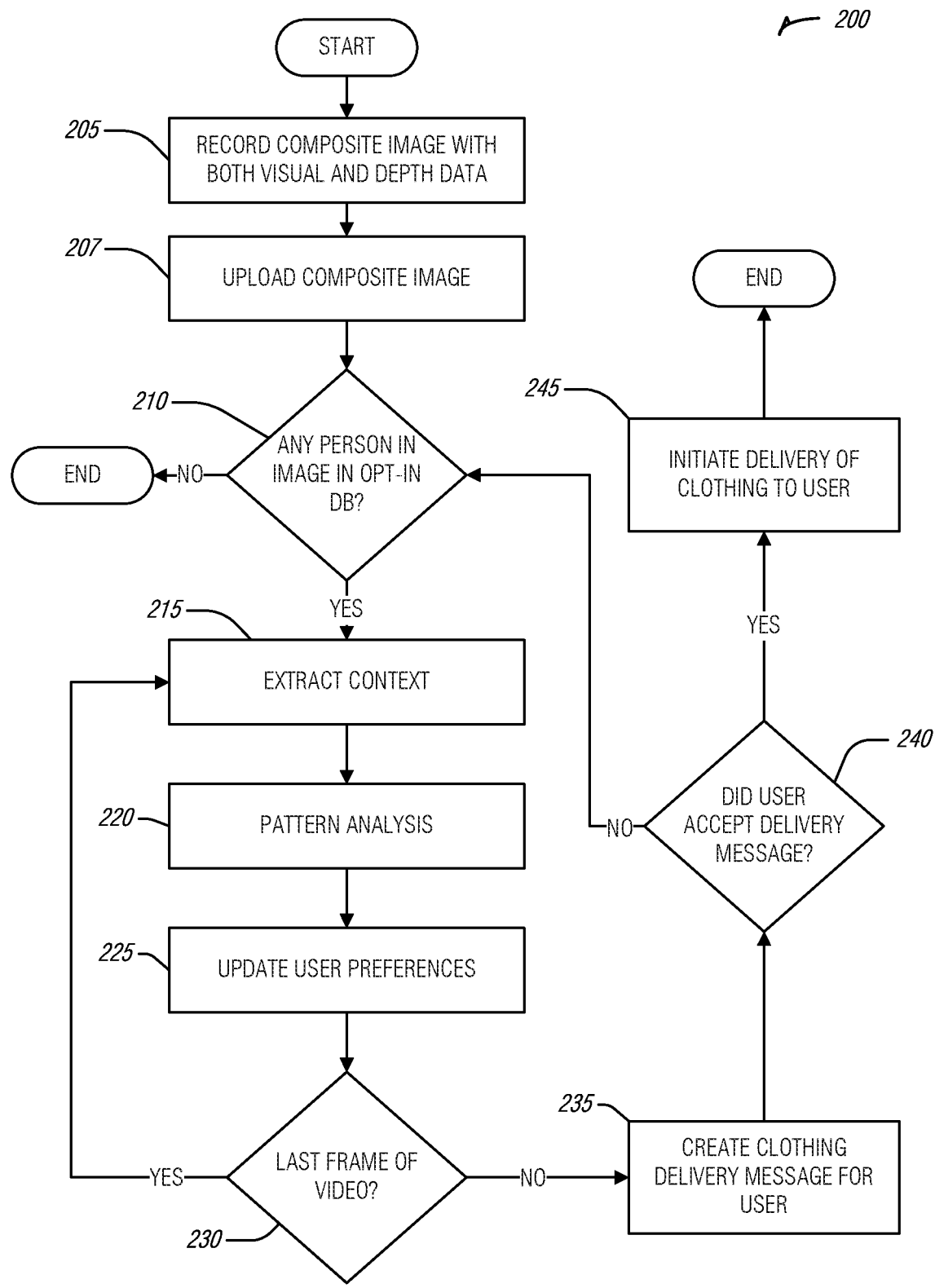
FIG. 2 illustrates an example of a method for computer vision assisted item search, according to an embodiment.

FIG. 2 illustrates an example of a method 200 for computer vision assisted item search, according to an embodiment. The operations of the method 200 are performed on computing hardware, such as that described above with respect to FIG. 1 or below with respect to FIG. 4 (e.g., circuit sets). The method 200 follows a use case; however, the specific characters or items presented are for illustrative purposes as other combinations of characters or items may be used in practice.

Jill is an enthusiast photographer who likes to take video of her friends and family. She is using her tablet with a visual and depth data capable sensor array to take video of her friends and family (e.g., operation 205). Her brother-in-law, George, and their friend Shellie are in a number of the videos that Jill has taken over the past two months. Jill, Shellie, and George are enrolled in an automated item location service to which a local-component application on her tablet automatically uploads her photos and other media (e.g., operation 207). The service uses the embedded depth-metadata to extract contextual information about items in Jill's pictures. The service may determine whether any person in the video has opted in to the program of automatic item location, such as Jill, George, or Shelley who has signed up for the program (e.g., operation 210). For each frame (e.g., composite image) of the video, the service may extract context (e.g., contextual information such as size, texture, shape, color, pattern, etc.) about items corresponding to people identified in the frame (e.g., operation 215). The service also searches for and finds similar media that includes George in the cloud service database.

Pattern analysis of the contextual data is automatically performed to determine the patterns and preferences of the individual in the frames (e.g., operation 220). The pattern analysis detects that George prefers a certain style of sports jacket, of Navy and Olive colors in a 42 Regular size, and color matching size 10 leather Oxford shoes. Contextual information or other conclusions of the context extraction or pattern analysis are included in the contextual information portfolio (e.g., user profile of George) (e.g., operation 225). The service then determines whether there are more frames in the video to process (e.g., operation 230).

Once the video is processed, e.g., with respect to George, the service performs a search to locate items, such as the sports jacket. The search results are weighted by the user profile. A subset of the search results are selected and communicated to George, for example, in a delivery message (e.g., operation 235). For example, five possible targeted results for George are found at two different retailers. The links to these items are texted to George.

Once the delivery message is received by the user, the user may be given an opportunity to indicate a desire for one or more of the items specified in the delivery message (e.g., operation 240). In this use case, George selects the Olive sports jacket and matching dark brown leather Oxford shoes from the first retailer. George also, in his response, requests same day delivery. In response to George's selection, the order is fulfilled and delivered to George's office (e.g., operation 245). In an example, Jill may be acknowledged (e.g., compensated) for providing the video in the first place in connection with George's acceptance of the delivery message. The method 200 may repeat the process for other users in the video (e.g., operation 210).

Figure 3:
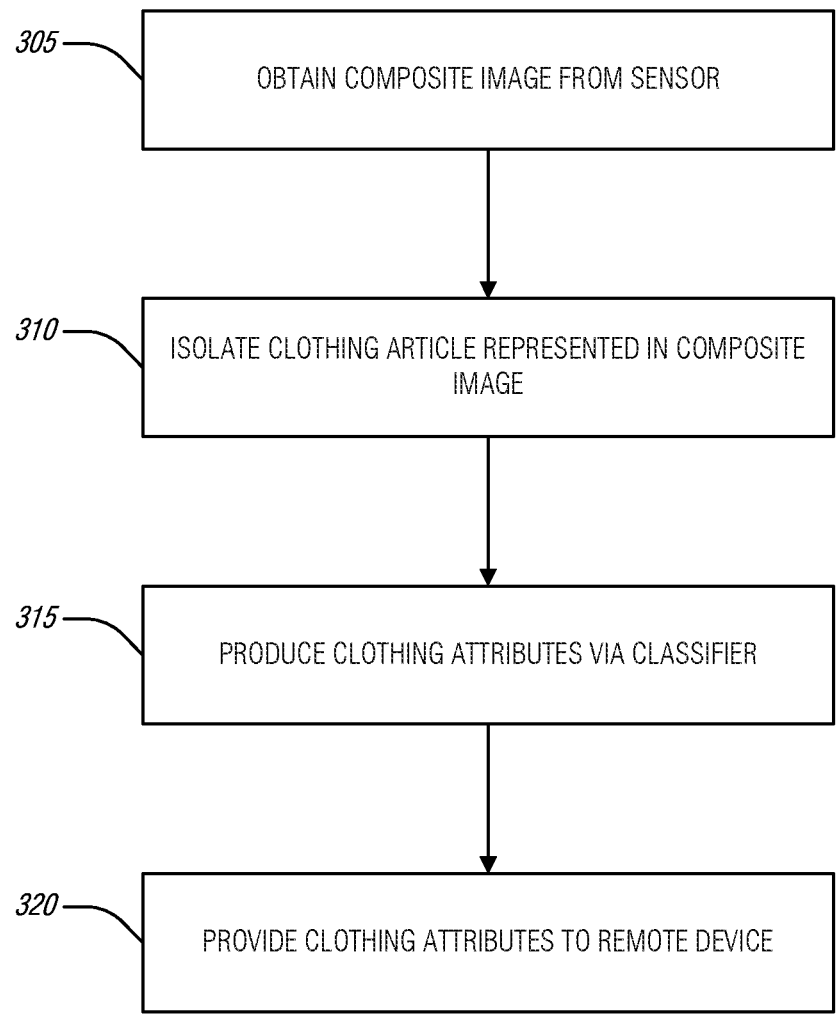
FIG. 3 illustrates an example of a method for computer vision assisted item search, according to an embodiment.

FIG. 3 illustrates an example of a method 300 for computer vision assisted item search, according to an embodiment. The operations of the method 300 are performed on computing hardware, such as that described above with respect to FIG. 1 or below with respect to FIG. 4 (e.g., circuit sets).

At operation 305, a composite image is obtained from a sensor. The obtained composite image includes both visual data and depth data.

At operation 310, the composite image is filtered to isolate a clothing article represented in the composite image. In an example, the composite image is filtered at a computing system remote from the sensor.

At operation 315, a classifier is applied to the depth data to produce a set of clothing attributes that correspond to the clothing article. In an example, the classifier is applied at a computing system remote from the sensor.

In an example, the set of clothing attributes include at least one of a size, a shape, or a texture. In an example, the set of clothing attributes includes a fabric, and wherein the classifier correlates a texture to the fabric using the depth data. In an example, the set of clothing attributes includes a clothing type provided by the filter. That is, the filter of operation 315 may identify the type of clothing during its isolation of the clothing from the composite image and pass the identification to the classifier. In an example, the classifier scales a representation of the clothing article in the composite image using the depth data to produce an estimate of absolute measurements of the clothing article. In an example, the classifier converts the estimate of absolute measurements to a clothing article size. In an example, classifier directly converts the depth data into a clothing article size (e.g., without first determining an absolute size of the clothing).

At operation 320, the clothing attributes may be provided to a remote device. In an example, the method 300 may extended to update a user profile with the clothing attributes, the clothing attributes corresponding to a clothing item object in a data structure of the user profile. In an example, these clothing attributes include at least one of a color or a pattern. In an example, the user profile includes a context data structure. This context data structure may include a set of fields that may correspond to one or more of geographic location, landmark, event, or companion.

In an example, the method 300 may be extended to search for additional clothing items using the clothing attributes and the user profile. In an example, the search results may be provided to a third party (such as a retailer). In an example, searching for additional clothing items includes applying a restriction that the additional clothing items differ from the clothing article in at least one of color, pattern, style, or type. In an example, where additional clothing items differ in type, the additional clothing items are filtered to combine with the clothing article, originally classified from the media, to add to a class of outfits (e.g., a tie that goes with an observed blouse, purse with dress, belt with shoes, etc.).

Figure 4:
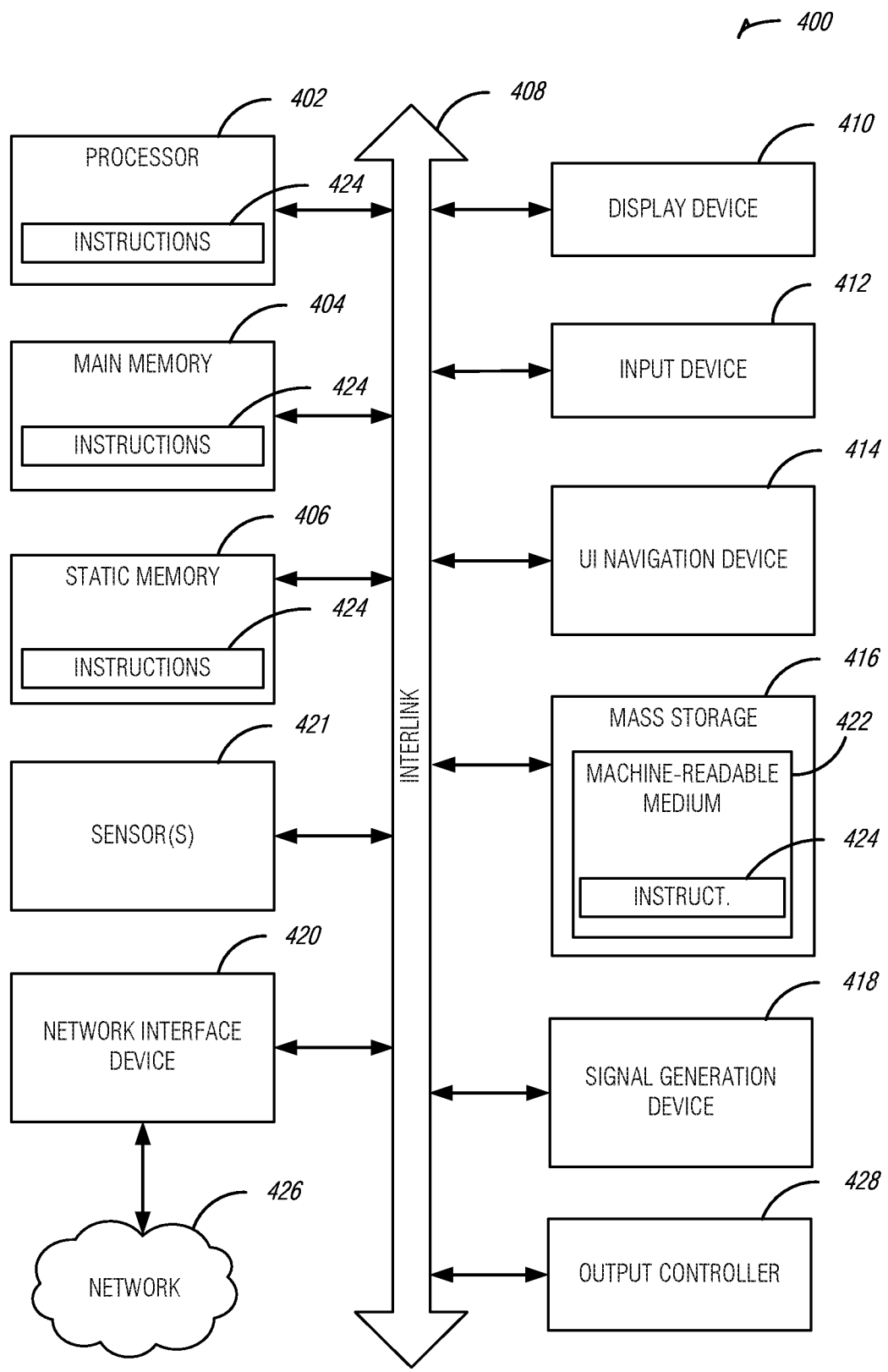
FIG. 4 is a block diagram illustrating an example of a machine upon which one or more embodiments may be implemented.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

ADDITIONAL NOTES & EXAMPLES

Example 1 is a system for computer vision assisted item search, the system comprising: an interface to obtain a composite image from a sensor, the composite image including visual data and depth data; a filter to isolate a clothing article represented in the composite image; a classifier to: accept the depth data; and produce a set of clothing attributes that correspond to the clothing article; and a transceiver to provide the clothing attributes to a remote device.

In Example 2, the subject matter of Example 1 optionally includes, wherein at least one of the filter or the classifier are at a computing system remote from the sensor array.

In Example 3, the subject matter of any one or more of Examples 1-2 optionally include, wherein the set of clothing attributes include at least one of a size, a shape, or a texture.

In Example 4, the subject matter of Example 3 optionally includes, wherein the set of clothing attributes include a fabric, and wherein the classifier is to correlate a texture to the fabric using the depth data.

In Example 5, the subject matter of any one or more of Examples 3-4 optionally include, wherein the set of clothing attributes include a clothing type provided by the filter, and wherein the classifier is to: scale a representation of the clothing article in the composite image using the depth data to produce an estimate of absolute measurements of the clothing article; and convert the estimate of absolute measurements to a clothing article size.

In Example 6, the subject matter of any one or more of Examples 3-5 optionally include, wherein the set of clothing attributes include a clothing type provided by the filter, and wherein the classifier is to directly convert the depth data into a clothing article size.

In Example 7, the subject matter of any one or more of Examples 1-6 optionally include the remote device, the remote device to update a user profile with the clothing attributes, the clothing attributes corresponding to a clothing item object in a data structure of the user profile.

In Example 8, the subject matter of Example 7 optionally includes, wherein the clothing attributes include at least one of a color or a pattern.

In Example 9, the subject matter of any one or more of Examples 7-8 optionally include, wherein the user profile includes a context data structure, the context data structure including a set of fields, the set of fields corresponding to at least one of geographic location, landmark, event, or companion.

In Example 10, the subject matter of any one or more of Examples 7-9 optionally include a search engine, the search engine to search for additional clothing items using the clothing attributes and the user profile.

In Example 11, the subject matter of Example 10 optionally includes, wherein to search for additional clothing items includes the search engine to apply a restriction that the additional clothing items differ from the clothing article in at least one of color, pattern, style, or type.

In Example 12, the subject matter of Example 11 optionally includes, wherein the additional clothing items differ in type, and wherein the additional clothing items are filtered to combine with the clothing article to add to a class of outfits.

In Example 13, the subject matter of any one or more of Examples 10-12 optionally include, wherein the search engine is to provide the search results to a third party.

Example 14 is a method for computer vision assisted item search, the method comprising: obtaining a composite image from a sensor array, the composite image including visual data and depth data; filtering the composite image to isolate a clothing article represented in the composite image; applying a classifier to the depth data to produce a set of clothing attributes that correspond to the clothing article; and providing the clothing attributes to a remote device.

In Example 15, the subject matter of Example 14 optionally includes, wherein at least one of filtering the composite image or applying the classifier occur at a computing system remote from the sensor.

In Example 16, the subject matter of any one or more of Examples 14-15 optionally include, wherein the set of clothing attributes include at least one of a size, a shape, or a texture.

In Example 17, the subject matter of Example 16 optionally includes, wherein the set of clothing attributes include a fabric, and wherein the classifier correlates a texture to the fabric using the depth data.

In Example 18, the subject matter of any one or more of Examples 16-17 optionally include, wherein the set of clothing attributes include a clothing type provided by the filter, and wherein the classifier scales a representation of the clothing article in the composite image using the depth data to produce an estimate of absolute measurements of the clothing article, and wherein the classifier converts the estimate of absolute measurements to a clothing article size.

In Example 19, the subject matter of any one or more of Examples 16-18 optionally include, wherein the set of clothing attributes include a clothing type provided by the filter, and wherein the classifier directly converts the depth data into a clothing article size.

In Example 20, the subject matter of any one or more of Examples 14-19 optionally include updating a user profile with the clothing attributes, the clothing attributes corresponding to a clothing item object in a data structure of the user profile.

In Example 21, the subject matter of Example 20 optionally includes, wherein the clothing attributes include at least one of a color or a pattern.

In Example 22, the subject matter of any one or more of Examples 20-21 optionally include, wherein the user profile includes a context data structure, the context data structure including a set of fields, the set of fields corresponding to at least one of geographic location, landmark, event, or companion.

In Example 23, the subject matter of any one or more of Examples 20-22 optionally include searching for additional clothing items using the clothing attributes and the user profile.

In Example 24, the subject matter of Example 23 optionally includes, wherein searching for additional clothing items includes applying a restriction that the additional clothing items differ from the clothing article in at least one of color, pattern, style, or type.

In Example 25, the subject matter of Example 24 optionally includes, wherein the additional clothing items differ in type, and wherein the additional clothing items are filtered to combine with the clothing article to add to a class of outfits.

In Example 26, the subject matter of any one or more of Examples 23-25 optionally include providing the search results to a third party.

Example 27 is a system comprising means to perform any method of Examples 14-26.

Example 28 is a machine readable medium including instructions that, when executed by a machine, cause the machine to perform any method of Examples 14-26.

Example 29 is a machine readable medium including instructions for computer vision assisted item search, the instructions, when executed by a machine, cause the machine to perform operations comprising: obtaining a composite image from a sensor array, the composite image including visual data and depth data; filtering the composite image to isolate a clothing article represented in the composite image; applying a classifier to the depth data to produce a set of clothing attributes that correspond to the clothing article; and providing the clothing attributes to a remote device.

In Example 30, the subject matter of Example 29 optionally includes, wherein at least one of filtering the composite image or applying the classifier occur at a computing system remote from the sensor.

In Example 31, the subject matter of any one or more of Examples 29-30 optionally include, wherein the set of clothing attributes include at least one of a size, a shape, or a texture.

In Example 32, the subject matter of Example 31 optionally includes, wherein the set of clothing attributes include a fabric, and wherein the classifier correlates a texture to the fabric using the depth data.

In Example 33, the subject matter of any one or more of Examples 31-32 optionally include, wherein the set of clothing attributes include a clothing type provided by the filter, and wherein the classifier scales a representation of the clothing article in the composite image using the depth data to produce an estimate of absolute measurements of the clothing article, and wherein the classifier converts the estimate of absolute measurements to a clothing article size.

In Example 34, the subject matter of any one or more of Examples 31-33 optionally include, wherein the set of clothing attributes include a clothing type provided by the filter, and wherein the classifier directly converts the depth data into a clothing article size.

In Example 35, the subject matter of any one or more of Examples 29-34 optionally include, wherein the operations comprise updating a user profile with the clothing attributes, the clothing attributes corresponding to a clothing item object in a data structure of the user profile.

In Example 36, the subject matter of Example 35 optionally includes, wherein the clothing attributes include at least one of a color or a pattern.

In Example 37, the subject matter of any one or more of Examples 35-36 optionally include, wherein the user profile includes a context data structure, the context data structure including a set of fields, the set of fields corresponding to at least one of geographic location, landmark, event, or companion.

In Example 38, the subject matter of any one or more of Examples 35-37 optionally include, wherein the operations comprise comprising searching for additional clothing items using the clothing attributes and the user profile.

In Example 39, the subject matter of Example 38 optionally includes, wherein searching for additional clothing items includes applying a restriction that the additional clothing items differ from the clothing article in at least one of color, pattern, style, or type.

In Example 40, the subject matter of Example 39 optionally includes, wherein the additional clothing items differ in type, and wherein the additional clothing items are filtered to combine with the clothing article to add to a class of outfits.

In Example 41, the subject matter of any one or more of Examples 38-40 optionally include, wherein the operations comprise comprising providing the search results to a third party.

Example 42 is a system for computer vision assisted item search, the system comprising: means for obtaining a composite image from a sensor array, the composite image including visual data and depth data; means for filtering the composite image to isolate a clothing article represented in the composite image; means for applying a classifier to the depth data to produce a set of clothing attributes that correspond to the clothing article; and means for providing the clothing attributes to a remote device.

In Example 43, the subject matter of Example 42 optionally includes, wherein at least one of filtering the composite image or applying the classifier occur at a computing system remote from the sensor.

In Example 44, the subject matter of any one or more of Examples 42-43 optionally include, wherein the set of clothing attributes include at least one of a size, a shape, or a texture.

In Example 45, the subject matter of Example 44 optionally includes, wherein the set of clothing attributes include a fabric, and wherein the classifier correlates a texture to the fabric using the depth data.

In Example 46, the subject matter of any one or more of Examples 44-45 optionally include, wherein the set of clothing attributes include a clothing type provided by the filter, and wherein the classifier scales a representation of the clothing article in the composite image using the depth data to produce an estimate of absolute measurements of the clothing article, and wherein the classifier converts the estimate of absolute measurements to a clothing article size.

In Example 47, the subject matter of any one or more of Examples 44-46 optionally include, wherein the set of clothing attributes include a clothing type provided by the filter, and wherein the classifier directly converts the depth data into a clothing article size.

In Example 48, the subject matter of any one or more of Examples 42-47 optionally include means for updating a user profile with the clothing attributes, the clothing attributes corresponding to a clothing item object in a data structure of the user profile.

In Example 49, the subject matter of Example 48 optionally includes, wherein the clothing attributes include at least one of a color or a pattern.

In Example 50, the subject matter of any one or more of Examples 48-49 optionally include, wherein the user profile includes a context data structure, the context data structure including a set of fields, the set of fields corresponding to at least one of geographic location, landmark, event, or companion.

In Example 51, the subject matter of any one or more of Examples 48-50 optionally include means for searching for additional clothing items using the clothing attributes and the user profile.

In Example 52, the subject matter of Example 51 optionally includes, wherein searching for additional clothing items includes means for applying a restriction that the addition clothing items differ from the clothing article in at least one of color, pattern, style, or type.

In Example 53, the subject matter of Example 52 optionally includes, wherein the additional clothing items differ in type, and wherein the additional clothing items are filtered to combine with the clothing article to add to a class of outfits.

In Example 54, the subject matter of any one or more of Examples 51-53 optionally include means for providing the search results to a third party.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:
1. At least one non-transitory machine readable medium comprising information representative of instructions that, when executed by processing circuitry, cause the processing circuitry to:
obtain visual data from a camera, the visual data representative of clothing;
obtain depth data from a depth sensor, the depth data representative of the clothing; and invoke:

use of artificial intelligence (AI) to determine a type of the clothing and a style of the clothing represented in the visual data and the depth data; and a search for clothing different than the clothing represented in the visual data, the search based on the type of clothing and the style of clothing, a result of the search including an article of clothing to be combined with the clothing as part of an outfit for a user.

2. The at least one machine readable medium of claim 1, wherein, to invoke use of AI, the instructions cause the processing circuitry to invoke an interface on a remote machine that is different than a machine containing the processing circuitry.

3. The at least one machine readable medium of claim 1, wherein, to invoke the search based on the type of clothing and the style of clothing, the instructions cause the processing circuitry to use a search interface on a remote machine that is different than a machine containing the processing circuitry.

4. The at least one machine readable medium of claim 1, wherein the clothing type is one of pants, underwear, shirt, shoes, jacket, dress, shorts, headwear, watch, necklace, or scarf.

5. The at least one machine readable medium of claim 1, wherein, to invoke the search based on the type of clothing and the style of clothing, the instructions cause the processing circuitry to specify a restriction that constrains results of the search to clothing items that are different than the clothing type.

6. The at least one machine readable medium of claim 5, wherein, to specify the restriction, the instructions cause the processing circuitry to specify a filter to constrain the results to clothing items to combine with the clothing to create the outfit for the user.

7. The at least one machine readable medium of claim 1, wherein the instructions cause the processing circuitry to deliver results of the search to the user.

8. A system comprising:
means for obtaining visual data from a camera, the visual data representative of clothing;
means for obtaining depth data from a depth sensor, the depth data representative of the clothing; and
means for invoking:
use of artificial intelligence (AI) to determine a type of the clothing and a style of the clothing represented in the visual data and the depth data; and
a search for clothing different than the clothing represented in the visual data, the search based on the type of clothing and the style of clothing, a result of the search including an article of clothing to be combined with the clothing as part of an outfit for a user.

9. The system of claim 8, wherein the means for invoking use of AI include means for invoking an interface on a remote machine that is different than a machine containing the means for invoking use of AI.

10. The system of claim 8, wherein the means for invoking the search based on the type of clothing and the style of clothing include means for using a search interface on a remote machine that is different than a machine containing the means for invoking the search.

11. The system of claim 8, wherein the clothing type is one of pants, underwear, shirt, shoes, jacket, dress, shorts, headwear, watch, necklace, or scarf.

12. The system of claim 8, wherein the means for invoking the search based on the type of clothing and the style of clothing include means for specifying a restriction that constrains results of the search to clothing items that are different than the clothing type.

13. The system of claim 12, wherein the means for specifying the restriction include specifying a filter to constrain the results to clothing items to combine with the clothing to create the outfit for the user.

14. The system of claim 8, further including means for delivering results of the search to the user.

15. A device comprising:
a camera to obtain visual data, the visual data representative of clothing;
a depth sensor to obtain depth data, the depth data representative of the clothing; and
processing circuitry to invoke:
use of artificial intelligence (AI) to determine a type of the clothing and a style of the clothing represented in the visual data and the depth data; and
a search for clothing different than the clothing represented in the visual data, the search based on the type of clothing and the style of clothing, a result of the search including an article of clothing to be combined with the clothing as part of an outfit for a user.

16. The device of claim 15, wherein, to invoke use of AI, the processing circuitry is configured to invoke an interface on a remote machine that is different than a machine containing the processing circuitry.

17. The device of claim 15, wherein, to invoke the search based on the type of clothing and the style of clothing, the processing circuitry is configured to use a search interface on a remote machine that is different than a machine containing the processing circuitry.

18. The device of claim 15, wherein the clothing type is one of pants, underwear, shirt, shoes, jacket, dress, shorts, headwear, watch, necklace, or scarf.

19. The device of claim 15, wherein, to invoke the search based on the type of clothing and the style of clothing, the processing circuitry is configured to specify a restriction that constrains results of the search to clothing items that are different than the clothing type.

20. The device of claim 19, wherein, to specify the restriction, the processing circuitry is configured to specify a filter to constrain the results to clothing items to combine with the clothing to create the outfit for the user.

21. The device of claim 15, wherein the processing circuitry is configured to deliver results of the search to the user.

22. At least one non-transitory machine readable medium comprising information representative of instructions that, when executed by processing circuitry, cause the processing circuitry to:
receive, via a network, visual data and depth data representative of clothing, the visual data from a camera of a device and the depth data from a depth sensor of the device;
invoke use of artificial intelligence (AI) to determine a type of the clothing and a style of the clothing represented in the visual data and the depth data;
perform a search for clothing different than the clothing represented in the visual data, the search based on the type of clothing and the style of clothing, a result of the search including an article of clothing to be combined with the clothing as part of an outfit for a user; and
deliver the result to the user.

23. The at least one machine readable medium of claim 22, wherein, to invoke use of AI, the instructions cause the processing circuitry to invoke a classifier to determine the type of the clothing.

24. The at least one machine readable medium of claim 22, wherein the clothing type is one of pants, underwear, shirt, shoes, jacket, dress, shorts, headwear, watch, necklace, or scarf.

25. The at least one machine readable medium of claim 22, wherein, to perform the search based on the type of clothing and the style of clothing, the instructions cause the processing circuitry to implement a restriction that constrain results to clothing items that are different than the type of the clothing.

26. The at least one machine readable medium of claim 25, wherein, to implement the restriction, the instructions cause the processing circuitry to constrain the results to clothing items to combine with the clothing to create the outfit for the user.

27. A system comprising:
    means for receiving, via a network, visual data and depth data representative of clothing, the visual data from a camera of a device and the depth data from a depth sensor of the device;
    means for invoking use of artificial intelligence (AI) to determine a type of the clothing and a style of the clothing represented in the visual data and the depth data;
    means for performing a search for clothing different than the clothing represented in the visual data, the search based on the type of clothing and the style of clothing, a result of the search including an article of clothing to be combined with the clothing as part of an outfit for a user; and
    means for delivering the result to the user.

28. The system of claim 27, wherein the means for invoking use of AI include means for invoking a classifier to determine the type of the clothing.

29. The system of claim 27, wherein the clothing type is one of pants, underwear, shirt, shoes, jacket, dress, shorts, headwear, watch, necklace, or scarf.

30. The system of claim 27, wherein means for the means for performing the search based on the type of clothing and the style of clothing include means for restricting results to clothing items that are different than the type of the clothing.

31. The system of claim 30, wherein the means for restricting the results to clothing items that are different than the type of the clothing include means for constraining the results to clothing items to combine with the clothing to create the outfit for the user.

32. A server comprising:
    a network interface to:
        receive, via a network, visual data and depth data representative of clothing, the visual data from a camera of a device and the depth data from a depth sensor of the device; and
        deliver a result of a search to a user; and
    processing circuitry to:
        invoke use of artificial intelligence (AI) to determine a type of the clothing and a style of the clothing represented in the visual data and the depth data; and
        perform the search for clothing different than the clothing represented in the visual data, the search based on the type of clothing and the style of clothing, the result of the search including an article of clothing to be combined with the clothing as part of an outfit for the user.

33. The server of claim 32, wherein, to invoke use of AI, the processing circuitry is configured to invoke a classifier to determine the type of the clothing.

34. The server of claim 32, wherein the clothing type is one of pants, underwear, shirt, shoes, jacket, dress, shorts, headwear, watch, necklace, or scarf.

35. The server of claim 32, wherein, to perform the search based on the type of clothing and the style of clothing, the processing circuitry is configured to implement a restriction that constrains results to clothing items that are different than the type of the clothing.

36. The server of claim 35, wherein, to implement the restriction, the processing circuitry is configured to constrain the results to clothing items to combine with the clothing to create the outfit for the user.

* * * * *